(12) United States Patent
Maekawa et al.

(10) Patent No.: US 6,375,358 B1
(45) Date of Patent: Apr. 23, 2002

(54) HYDRODYNAMIC BEARING APPARATUS AND DEFLECTION SCANNING APPARATUS HAVING SAME

(75) Inventors: Ichiro Maekawa, Kawasaki; Kazutaka Takeuchi, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/553,619

(22) Filed: Apr. 20, 2000

(30) Foreign Application Priority Data

Apr. 22, 1999 (JP) ............................................ 11-114361
Apr. 18, 2000 (JP) ........................................ 2000-116008

(51) Int. Cl.⁷ ........................... F16C 32/06; G02B 26/12
(52) U.S. Cl. ........................ 384/107; 384/100; 359/200
(58) Field of Search ................................. 384/100, 107, 384/114; 359/198, 200

(56) References Cited

U.S. PATENT DOCUMENTS 3,907,689 A * 9/1975 Carver ...................... 252/8.84
5,357,272 A * 10/1994 Watanabe et al. ............ 347/257
5,596,443 A * 1/1997 Konno et al. ................ 359/200
5,831,363 A * 11/1998 Fukita et al. .................. 310/91
5,907,456 A * 5/1999 Khan et al. .............. 360/99.08

\* cited by examiner

*Primary Examiner*—Richard M. Lorence
(74) *Attorney, Agent, or Firm*—Fitzpatrick, Cella, Harper & Scinto

(57) ABSTRACT

A shaft integral with a rotary polygon mirror is fitted in a sleeve so as to be rotatable, and the bearing clearance is filled with a lubricant. The lubricant comprises a base oil comprising a mixed oil consisting of a plurality of components whose vapor pressures are equal or close to each other. Suitably combining components of different viscosities makes it possible to prepare the lubricant so as to have such a viscosity to match with the bearing characteristics. Selection of components having a little difference in vapor pressure prevents viscosity change due to volatilization of a specific component. Thus, the viscosity change of the lubricant in the bearing clearance is prevented.

9 Claims, 4 Drawing Sheets

HYDRODYNAMIC BEARING APPARATUS AND DEFLECTION SCANNING APPARATUS HAVING SAME

BACKGROUND OF THE INVENTION

1. Field of the Invention

The present invention relates to a hydrodynamic bearing structure having hydrodynamic (dynamic-pressure) grooves and to a rotating apparatus having the hydrodynamic bearing structure, a deflection scanning apparatus, a laser beam printer, an image forming apparatus, and a rotating apparatus of hard disk. More particularly, the invention concerns a hydrodynamic bearing apparatus for rotationally supporting a rotary polygon mirror or the like for high-speed scanning with a light beam in laser beam printers, bar code readers, etc., a method of producing the hydrodynamic bearing apparatus, and a deflection scanning apparatus using the hydrodynamic bearing apparatus.

2. Related Background Art

The deflection scanning apparatus used in the laser beam printers, bar code readers, etc. is constructed to implement deflection scanning with a light beam such as a laser beam or the like by use of a rotary polygon mirror rotating at a high speed. In the image forming apparatus such as the laser beam printers or the like, the scanning light yielded by the rotary polygon mirror is focused on a photosensitive body on a rotary drum to form an electrostatic latent image thereon, the electrostatic latent image on the photosensitive body is developed into a toner image by a developing device, the toner image is transferred onto a recording medium of a recording sheet, and the recording medium with the toner image is transferred to a fixing device to heat the toner on the recording medium to fix it, thereby performing printing.

The deflection scanning apparatus of this structure has been increasing its operation speed and accuracy more and more in recent years and, in response thereto, the hydrodynamic bearing apparatus of a non-contact type to permit low-noise and high-accuracy rotation has been and is employed in the bearing part of the rotary polygon mirror.

FIG. 1 is a schematic, cross-sectional view showing a hydrodynamic bearing unit according to a conventional example. The bearing unit has a shaft 102, which is arranged to rotate integrally with a rotary polygon mirror 101 having a plurality of reflecting facets 101a, and a sleeve 103, in which the shaft 102 is fitted so as to be rotatable. The sleeve 103 is integral with a bearing housing 104. Fixed at the lower end of the sleeve 103 is a thrust pad 106 provided with a spherical portion 106a for supporting the lower end of the shaft 102 in the thrust direction. A flange 107 is fixed to the shaft 102 at the upper part thereof. The rotary polygon mirror 101 is pressed against the upper surface of the flange 107 by an elastic press mechanism 108 including a presser spring, etc. to form an integral structure therewith, so as to rotate together with the shaft 102.

A yoke 109a holding rotor magnets 109 is fixed to the peripheral part of the flange 107 and the rotor magnets 109 are opposed to al stator coil 110 on a base plate 105 fixed to the bearing housing 104. When the stator coil 110 is energized by a driving current supplied from a driving circuit (not shown), the rotor magnets 109 rotate at about 10,000 or 20,000 rpm together with the shaft 102 and rotary polygon mirror 101.

A fluid membrane is created between the sleeve 103 and the shaft 102 with rotation thereof, thereby constituting a hydrodynamic bearing which rotationally supports the shaft 102 in a non-contact state by the dynamic pressure of the fluid membrane. First dynamic-pressure generating grooves 102a and second dynamic-pressure generating grooves 102b are cut with some spacing in between and in the stated order in the upward direction from the lower end of the shaft 102 in the peripheral surface of the shaft 102. Shallow grooves (not shown) forming a hydrodynamic thrust bearing are also provided at the position facing the lower end of the shaft 102, in the upper surface of the thrust pad 106.

With rotation of the shaft 102, a fluid 111 such as oil or the like present in a bearing clearance between the shaft 102 and the sleeve 103 is pulled into the central part of each dynamic-pressure generating groove 102a, 102b to generate a high-pressure region there. Such high-pressure regions work to support the shaft 102 while maintaining the non-contact state in the radial direction between the shaft 102 and the sleeve 103. Because of this non-contact rotation, the above bearing structure has advantages of capability of yielding properties such as lower noise, higher rotation accuracy, etc. than sliding bearings accompanied by metal contact and capability of reducing the size and cost in terms of the number of assembled parts as compared with, for example, rolling bearings, etc.

Used heretofore as a base oil of a lubricant for such hydrodynamic bearing apparatus were oils having a molecular weight distribution, such as mineral oils, synthetic hydrocarbon oils, silicone oils, perfluoro oils, etc., single-component oils such as diester oils, polyol ester oils, and so on, and mixed oils thereof.

For rotating the hydrodynamic bearing apparatus, there were desires for decrease in viscosity of the mixed oils, and the components of the mixed oils and percentages of the components were determined for the purpose of adjusting the viscosity. Describing in more detail, because the load carrying capacity and bearing rigidity of the hydrodynamic bearing apparatus are proportional to the viscosity of the lubricant used, it is necessary to select the lubricant of the viscosity matching with the required characteristics of an equipment provided with the hydrodynamic bearing apparatus. In addition, it is necessary that the change in the viscosity is small for the selected lubricant during long-term use.

It is relatively easy to adjust the viscosity to an arbitrary value for the oils such as the mineral oils, synthetic hydrocarbon oils, silicone oils, perfluoro oils, etc. used heretofore as base oils of lubricants. Since these base oils themselves have a broad molecular weight distribution, low-molecular-weight components thereof will volatilize during use over an extended period of time as a lubricant of the hydrodynamic bearing apparatus, so as to vary the viscosity gradually. More specifically, the percentages of the low-molecular-weight components in the lubricant will lower under the long-term use of the hydrodynamic bearing apparatus, so that the viscosity of the lubricant will become higher. Because of such a change in viscosity with the elapse of time, it is difficult to keep the load carrying capacity and bearing rigidity constant throughout the long-term use.

In cases where the so-called single-component oil such as diester oils, polyol ester oils, purified and separated synthetic hydrocarbon oils, for example, PAO (poly-α-olefins), etc. is used, without carrying out the step of adjusting the viscosity by addition of another oil, because the viscosity of the base oil is perfectly dependent upon the molecular structure of the single-component oil itself, molecular design is required for adjusting the base oil to an arbitrary viscosity matching with the required characteristics of the equipment provided with the bearing apparatus and it is thus hard to obtain a desired single-component oil.

As to the conventional mixed oils, it is relatively easy to adjust the viscosity thereof to an arbitrary value by combining a low-viscosity-component oil with a high-viscosity-component oil, as compared with the single-component oils. Since the conventional mixed oils were prepared while focusing on the adjustment of viscosity, they demonstrated variation in the composition of the base oil because of volatilization of highly volatile components or low-molecular-weight oils during long-term use as a lubricant of the hydrodynamic bearing apparatus, as described above. As a consequence, a change in viscosity occurred with the elapse of time.

SUMMARY OF THE INVENTION

The present invention has been accomplished in view of the unsolved problems of the prior art and an object of the present invention is to provide a hydrodynamic bearing apparatus capable of making great contribution to stabilization of bearing performance and to improvement in rotation accuracy by use of the lubricant having an arbitrary viscosity matching with the required characteristics of the equipment provided with the bearing apparatus (hereinafter referred to as "bearing characteristics") and demonstrating little change in viscosity even under long-term use, and a deflection scanning apparatus using it.

In order to accomplish the above object, a hydrodynamic bearing apparatus of the present invention comprises a shaft member and a sleeve member fitted so as to be rotatable relative to each other, a lubricant filling a bearing clearance between the shaft member and the sleeve member, and a rotary member integrally coupled to the shaft member or the sleeve member, wherein the lubricant comprises a base oil comprising a mixed oil consisting of a plurality of components the vapor pressures of which are equal or close to each other.

The difference in vapor pressure of the plural components is preferably not more than $5 \times 10^{-4}$ Torr and more preferably not more than $5 \times 10^{-5}$ Torr in the temperature range of not less than 0° C. and not more than 60° C.

In the present invention, the base oil of the lubricant is a mixed oil prepared in such a viscosity as to match with the bearing characteristics by combining a plurality of components of different viscosities. The viscosity change of the lubricant due to volatilization of a specific component is prevented by selecting the combination of the base-oil components such that the vapor pressures of the plural components are equal to each other or such that the difference in vapor pressure thereof is not more than $5 \times 10^{-4}$ Torr and, describing in further detail, not more than $5 \times 10^{-5}$ Torr.

As a consequence, the hydrodynamic bearing apparatus can be realized without a change in viscosity of the lubricant even in case of long-term use, while maintaining high rotation accuracy and stable bearing performance.

When the hydrodynamic bearing apparatus of this structure is applied to the bearing part of the rotary polygon mirror, contribution can be made to attainment of a longer life and higher performance of the deflection scanning apparatus.

DESCRIPTION OF THE PREFERRED EMBODIMENTS

The embodiments of the present invention will be described with reference to the accompanying drawings.

It is noted in the present claims and specification that 760 Torr corresponds to 1 atm and to 101.325 kPa.

Figure 1:
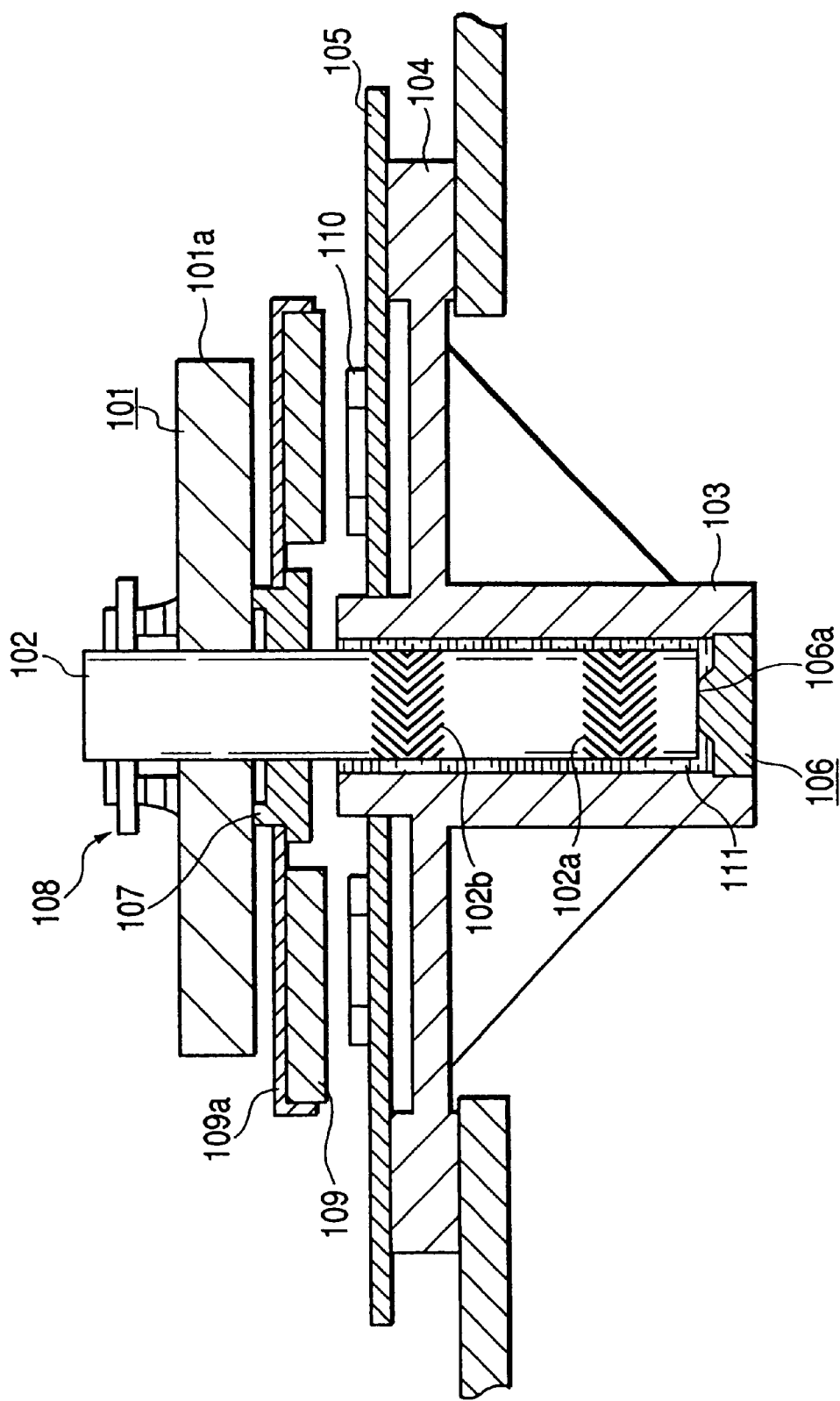
FIG. 1 is a schematic, partial sectional view showing the main part of the deflection scanning apparatus according to a conventional example.
Figure 2:
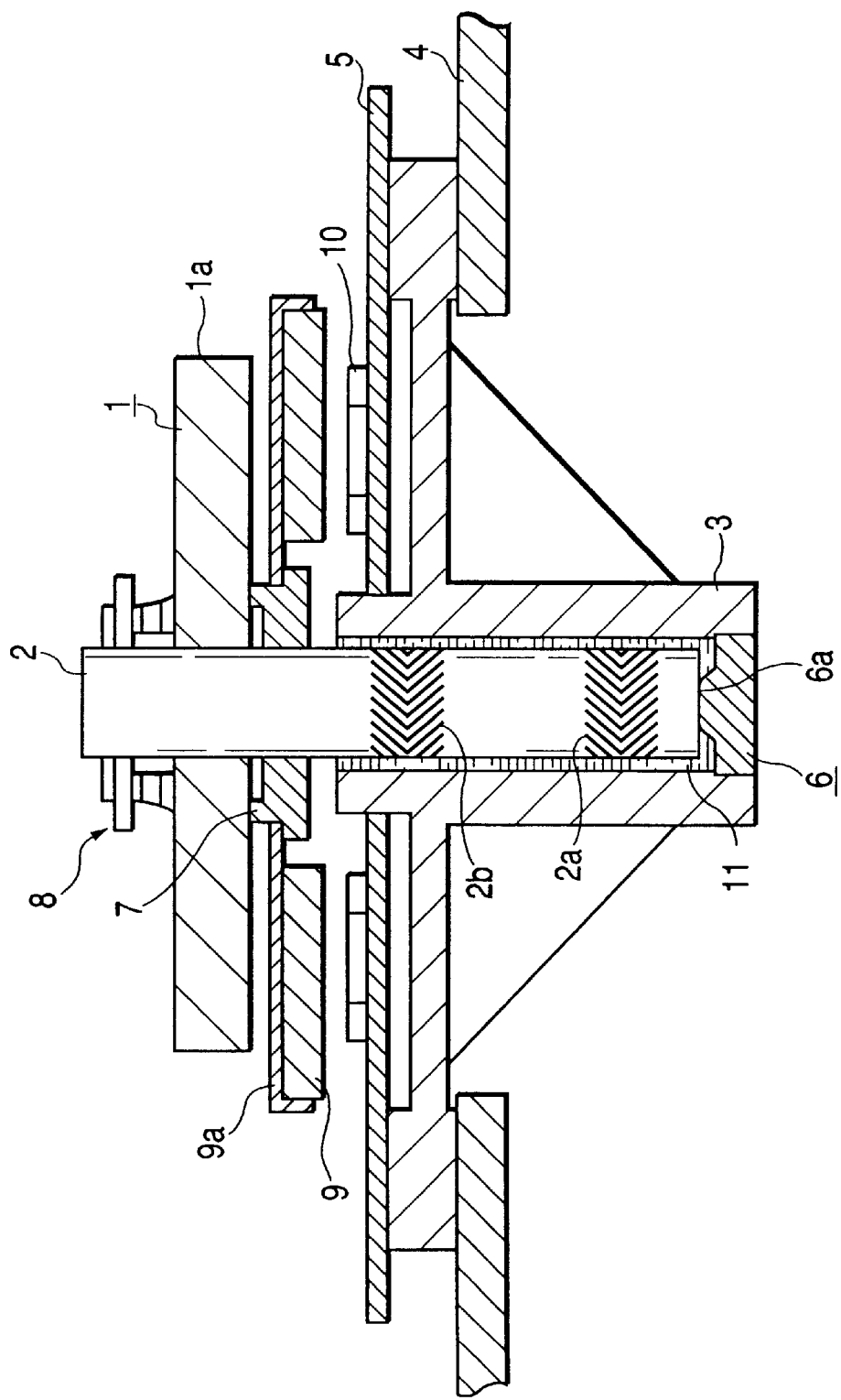
FIG. 2 is a schematic, partial sectional view showing the major part of the deflection scanning apparatus according to an embodiment of the present invention.

FIG. 2 is a schematic, cross-sectional view showing the hydrodynamic bearing apparatus according to a preferred embodiment of the present invention. The hydrodynamic bearing apparatus has a shaft 2 which is a shaft member integrally rotating with a rotary polygon mirror 1 having a plurality of reflecting facets 1a, and a sleeve which is a sleeve member in which the shaft 2 is fitted so as to be, rotatable. The sleeve 3 is integral with a bearing housing 4. A thrust plate 6 provided with a spherical portion 6a for supporting the lower end of the shaft 2 in the thrust direction is fixed to the lower end of the sleeve 3, and a flange 7 as a rotary member is fixed to the upper part of the shaft 2. The rotary polygon mirror 1 is pressed against the upper surface of the flange 7 by an elastic press mechanism 8 including a presser spring, etc. to be integral therewith, and thus is arranged to rotate together with the shaft 2.

A yoke 9a holding rotor magnets 9 is fixed to the outer periphery of the flange 7, and the rotor magnets 9 are arranged so as to face a stator coil 10 on a motor board 5 fixed to the bearing housing 4. When the stator coil 10 is energized by driving current supplied from a driving circuit (not shown), the rotor magnets 9 rotate together with the shaft 2 and the rotary polygon mirror 1.

A fluid membrane is created between the sleeve 3 and the shaft 2 with rotation of the shaft 2, whereby the shaft 2 is rotationally supported in no contact with the sleeve by dynamic pressure of the fluid membrane. First dynamic-pressure generating grooves 2a and second dynamic-pressure generating grooves 2b are formed with spacing in the upward direction and in the stated order from the lower end of the shaft 2, on the peripheral surface of the shaft 2. Shallow grooves (not shown) forming a hydrodynamic thrust bearing are also provided at the position opposite to the lower end of the shaft 2, on the upper surface of the thrust plate 6.

With rotation of the shaft 2, the lubricant 11 filling the bearing clearance between the shaft 2 and the sleeve 3 is pulled into the central part of each dynamic-pressure generating groove 2a, 2b, thereby creating a high-pressure region there. The high-pressure regions support the shaft 2 in a non-contact state with the sleeve 3 in the radial direction. This non-contact rotation presents the advantages of capability of yielding such characteristics as lower noise and higher rotation accuracy than, for example, sliding bearings accompanied by metal contact and of capability of accomplishing smaller size and lower cost than rolling bearings, etc. in terms of the number of assembled parts.

The base oil of the lubricant 11 is a mixed oil containing a mixture of those plural components whose vapor pressures are equal to or close to each other. Specifically, it is desirable to employ a mixed oil containing a mixture of at least two types of single-component oils having a difference in vapor pressure of not more than $5\times10^{-5}$ Torr in the temperature range of 0 to 60° C., as a base oil.

For example, a lubricant is used which comprises a base oil obtained by mixing two or more single-component oils (components) A to F listed in Table 1 so as to yield a desired viscosity under the above mentioned conditions.

TABLE 1

|   | Component of base oil | Kinematic viscosity/cst (40° C.) | Vapor pressure/Torr (60° C.) |
| --- | --- | --- | --- |
| A | trimethylol propane tripelargonate | 20.9 | $2.3 \times 10^{-7}$ |
| B | trimethylol propane tricaprylate | 17.1 | $6.4 \times 10^{-6}$ |
| C | trimethylol propane trienanthate | 13.9 | $5.0 \times 10^{-5}$ |
| D | diisooctyl adipate | 15.7 | $4.2 \times 10^{-6}$ |
| E | dioctyl azelate | 11.2 | $1.1 \times 10^{-6}$ |
| F | dioctyl adipate | 9.7 | $7.5 \times 10^{-5}$ |

By appropriately combining the single-component oils of Table 1, the lubricant 11 can be formulated in the optimal viscosity for attainment of the bearing characteristics of the hydrodynamic bearing apparatus for rotationally supporting the rotary polygon mirror 1. At this time, by selecting the components such that the difference between the vapor pressures of the respective single-component oils is not more than $5\times10^{-5}$ Torr, it is possible to avoid the viscosity change due to volatilization of a specific component.

By using the lubricant which was formulated in the optimal viscosity for attainment of the bearing characteristics and are free of the viscosity change even under long-term use as described above, great contribution can be made to improvement and stabilization in the bearing performance of the hydrodynamic bearing apparatus.

This promotes achievement of higher performance and a longer service life of the deflection scanning apparatus.

Further, this can also decrease the use amount of the lubricant and also decrease the volume of the clearance between the shaft and the sleeve, i.e., narrow the width of the gap. Therefore, size reduction of the apparatus can be realized.

In the present embodiment, the dynamic-pressure generating grooves are provided on the rotating shaft, but the present invention may also be applied to the other type of hydrodynamic bearing apparatus having the structure in which the dynamic-pressure generating grooves are not provided on the rotating shaft but provided on the fixed sleeve.

The present invention can also provide the hydrodynamic bearing apparatus that rotates at the rotational speed of not less than 10,000 rpm, further at the rotational speed of not less than 18,000 rpm, yet further at the rotational speed of not less than 25,000 rpm, and even at the rotational speed of not less than 30,000 rpm.

Since the lubricant according to the present invention is resistant to a change in viscosity with the elapse of time, the width of the gap between the shaft and the sleeve can be narrowed by about 1 μm to 2 μm. As a consequence, the apparatus can be constructed in a smaller size.

The present invention is preferably applicable to the hydrodynamic bearing apparatus for high-speed rotation in which at least one of the shaft and the sleeve is made of, for example, a ceramic material.

The reason is as follows. The probability of contact between the shaft and the sleeve becomes higher with decreasing width of the gap between them. However, since the lubricant can maintain a low viscosity, the shaft and the sleeve are prevented from being chipped even in occurrence of accidental contact.

The hydrodynamic bearing apparatus of the present invention preferably comprises a lubricant containing an alcohol in addition to those plural oils whose vapor pressures are equal to or close to each other. Although the exact mechanism is not fully understood, it is thought that the incorporation of an alcohol into the lubricant causes hydroxyl groups to cover those surfaces which are in contact with the lubricant, thus making the surfaces resistant to shaving.

In this case, the alcohol is preferably an alcohol obtained by substituting the ester groups of at least one of the aforementioned oils which constitute the lubricant, with alcohol groups, in order that the viscosity of the lubricant is difficult to be changed with the elapse of time.

EXAMPLES

The following examples are given for the purpose of illustration and not by way of limitation.

Example 1

For a hydrodynamic bearing apparatus designed so as to generate the optimum dynamic pressure when using a lubricant having a kinematic viscosity of 16.5 cst at 40° C., a lubricant was employed which was obtained by adding to a base oil consisting of 85 parts by weight of the above mentioned component A and 15 parts by weight of the above mentioned component D, 0.5 part by weight of tris(2-butoxypropyl)phosphate as a film-forming agent for forming a reinforcing film on a surface of a metal and 0.1 part by weight of 2, 6-di-t-butyl-4-methyl-phenol as an antioxidant for preventing oxidation of the base oil.

Example 2

For a hydrodynamic bearing apparatus designed so as to generate the optimum dynamic pressure when using a lubricant having a kinematic viscosity of 13.3 cst at 40° C., a lubricant was employed which was obtained by adding to a base oil consisting of 47 parts by weight of the above component D and 53 parts by weight of the above component E, 0.5 part by weight of tris(2-butoxypropyl)phosphate and 0.1 part by weight of 2, 6-di-t-butyl-4-methyl-phenol.

Comparative Example 1

For a hydrodynamic bearing apparatus designed so as to generate the optimum dynamic pressure when using a lubricant having a kinematic viscosity of 16.5 cst at 40° C., a lubricant was employed which was obtained by adding to a base oil consisting of 80 parts by weight of the above component B and 20 parts by weight of the above component C, 0.5 part by weight of tris(2-butoxypropyl)phosphate and 0.1 part by weight of 2, 6-di-t-butyl-4-methyl-phenol.

Comparative Example 2

For a hydrodynamic bearing apparatus designed so as to generate the optimum dynamic pressure when using a lubricant having a kinematic viscosity of 13.3 cst at 40° C., a lubricant was employed which was obtained by adding to a base oil consisting of 60 parts by weight of the above component D and 40 parts by weight of the above component F, 0.5 part by weight of tris(2-butoxypropyl)phosphate and 0.1 part by weight of 2, 6-di-t-butyl-4-methyl-phenol.

In Example 1, any kinematic viscosity within the range of 20.9 to 15.7 cst of the base oil can be selected by suitably selecting the mixing ratio of the component A and the component D of the base oil.

In case of the base oil consisting of one single-component oil, the base oil itself must be replaced in order to meet such a viscosity as to match with the bearing characteristics, but it is very difficult to develop a single-component oil having, for example, the viscosity (16.5 cst at 40° C.) suitable for Example 1.

Therefore, constituting the base oil of a plurality of components increases the degree of freedom in selecting the viscosity of the lubricant.

Figure 3:
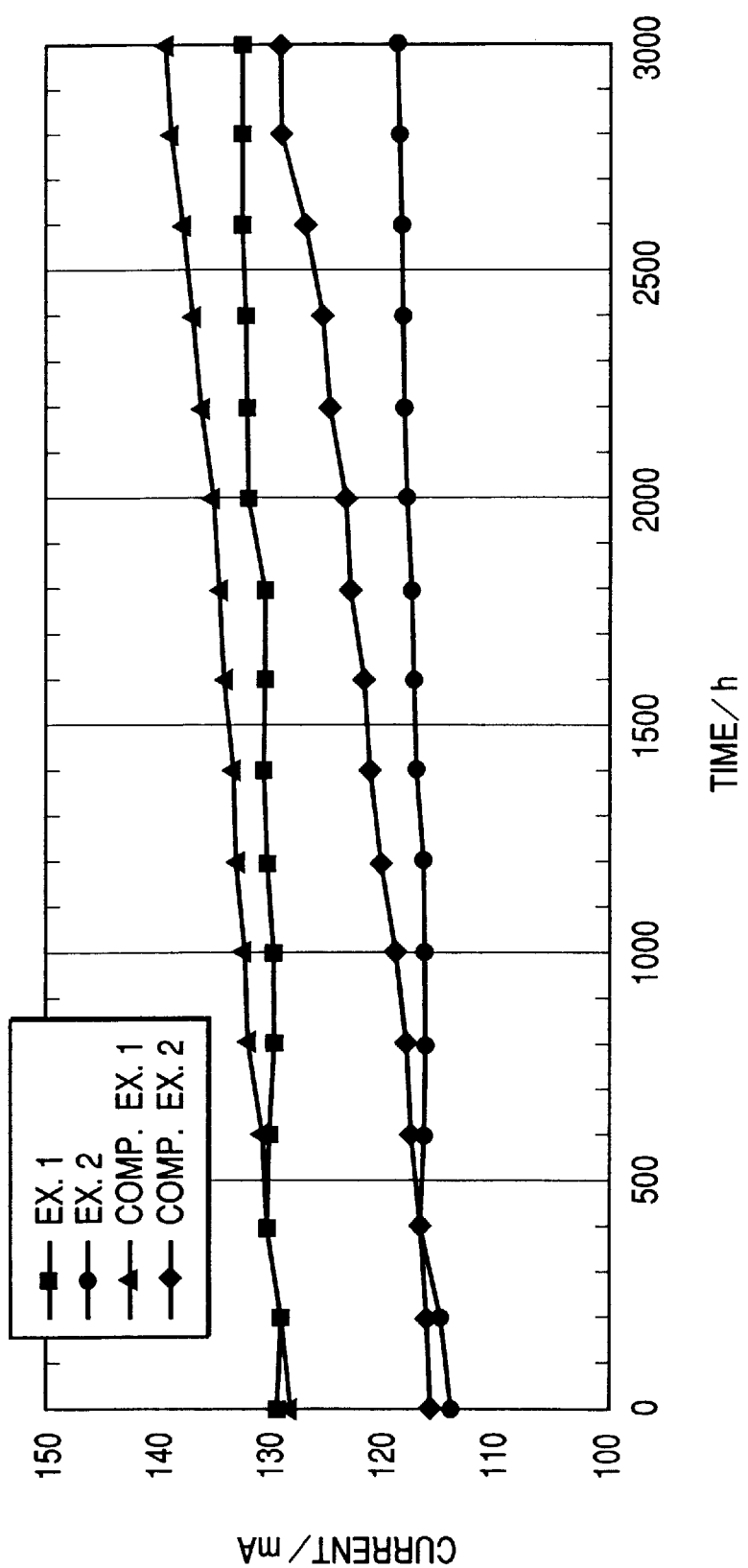
FIG. 3 is a graph showing comparison of bearing performance between Examples 1 and 2, and Comparative Examples 1 and 2.

FIG. 3 is a graph showing a change of current necessary for rotational driving depending on the elapsed time where the hydrodynamic bearing apparatuses using the lubricants of Examples 1 and 2 and Comparative Examples 1 and 2 were each rotated at 22000 rpm in a thermostat kept at 60° C. As is apparent from the graph, the change in the driving current is little in Examples 1 and 2, whereas the change in the driving current is large in Comparative Examples 1 and 2. Table 2 shows the components and the difference in vapor pressure of the base oil as used in each of the examples and comparative examples.

TABLE 2

| | | Vapor pressure difference/Torr (60° C.) |
|---|---|---|
| Example 1 | component A and component D | $4.0 \times 10^{-6}$ |
| Example 2 | component D and component E | $3.1 \times 10^{-6}$ |
| Comparative Example 1 | component B and component C | $5.3 \times 10^{-5}$ |
| Comparative Example 2 | component D and component F | $7.1 \times 10^{-6}$ |

Since in Comparative Examples 1 and 2 the vapor pressure difference is large under the use atmosphere between the components used in the base oil, the lubricant increases its viscosity because of volatilization of the highly volatile component (for example, the component C in Comparative Example 1).

Further studies has verified it desirable that the vapor pressures under the use atmosphere of the plurality of components used in the base oil of the lubricant are equal to each other or different little from each other such that the difference in vapor pressure between them is not more than $5 \times 10^{-5}$ Torr.

Example 3

The lubricant 11 used for the apparatus of FIG. 2 was obtained by using a mixed oil consisting of 85 parts by weight of the component A and 15 parts by weight of the component D as a base oil and adding 0.5 part by weight in total of a known antioxidant, corrosion inhibitor, etc. to 100 parts by weight of the base oil. The rotary polygon mirror 1 had good rotation performance and high image quality was able to be maintained on a stable basis throughout a long period.

Figure 4:
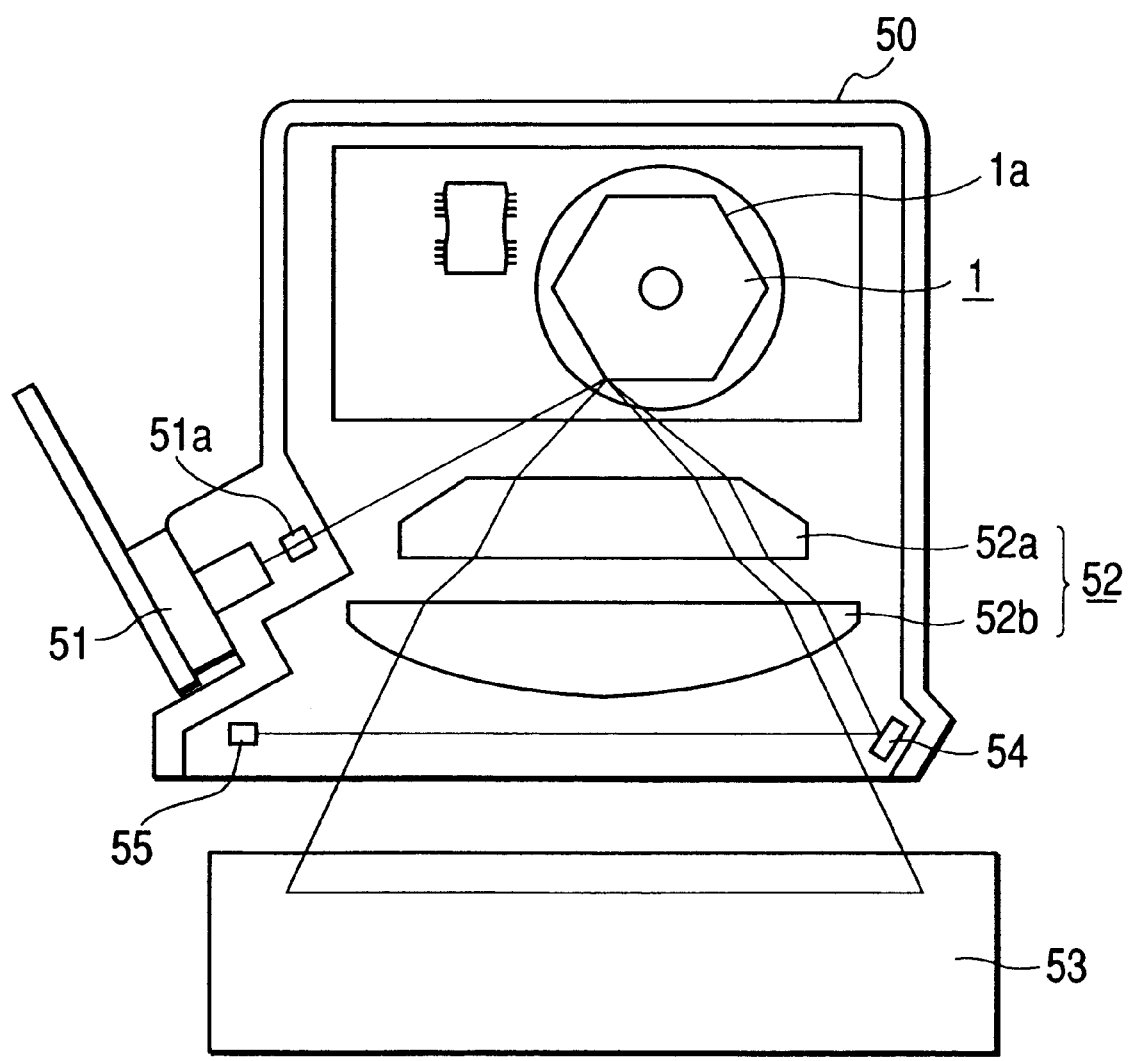
FIG. 4 is a view illustrating the whole of the deflection scanning apparatus.

FIG. 4 shows the whole of the deflection scanning apparatus according to the present invention. This apparatus has a light source 51 for emitting a light beam (flux of light) such as the laser light or the like, and a cylindrical lens 51a for condensing the laser light into a linear shape on the reflecting facet 1a of the rotary polygon mirror 1, and is arranged to effect deflection scanning with the light beam by rotation of the rotary polygon mirror 1 and guide the light beam through an imaging lens system 52 as an imaging optical system to focus it on an image surface of a photosensitive body 53 on a rotary drum. The imaging lens system 52 has a spherical lens 52a, a toric lens 52b, etc. and has the so-called fθ function to correct for scanning speed or the like of a point image formed on the photosensitive body 53.

With the rotation of the rotary polygon mirror 1 by the aforementioned motor, the reflecting facets 1a thereof rotate at an equal speed about the axis of the rotary polygon mirror 1. The angles between the normal to the reflecting facet 1a off the rotary polygon mirror 1 and the optical path of the light beam emitted from the light source 51 and condensed by the cylindrical lens 51a as described above, i.e., the angles of incidence of the light beam to the reflecting facet 1a, vary temporally with rotation of the rotary polygon mirror 1, and the angles of reflection also vary similarly. Thus, the point image formed on the photosensitive body 53 from the light beam moves (or scans the rotary drum) in the axial direction (or the main scanning direction) of the drum.

The imaging lens system 52 is designed so as to focus the light beam reflected at the rotary polygon mirror 1 into the point image of a predetermined spot shape on the photosensitive body 53 and keep the scanning speed of the point image constant in the main scanning direction.

The point image focused on the photosensitive body 53 forms an electrostatic latent image, based on main scanning with rotation of the rotary polygon mirror 1 and sub-scanning with rotation of the rotary drum having the photosensitive body 53 about the axis thereof.

Around the photosensitive body 53 there are a charging device for uniformly charging the surface of the photosensitive body 53, a developing device for developing the electrostatic latent image formed on the surface of the photosensitive body 53 into a toner image, a transferring device for transferring the toner image onto a recording sheet (these devices being omitted from the illustration), etc., whereby the information recorded by the light beam emitted from the light source 51 is printed on the recording sheet or the like.

A detection mirror 54 reflects the light beam upstream of the main scanning direction with respect to the optical path of the light beam incident to the start position of writing of the recorded information on the surface of the photosensitive body 53, so as to guide the beam onto a photoreceptive surface of a light-receiving element 55 having a photodiode or the like. When the photoreceptive surface is illuminated by the light beam, the light-receiving element 55 outputs a scan start signal for detecting the scanning start position (writing start position).

The light source 51 emits the light beam according to signals supplied from a processing circuit for processing information from a host computer. The signals supplied to the light source 51 correspond to the information to be written on the photosensitive body 53, and the processing circuit supplies each signal indicating information corresponding to one scan line being a locus formed by the point image on the surface of the photosensitive body 53, as one unit, to the light source 51. This information signal is transmitted in synchronism with the scanning start signal supplied from the light-receiving element 55.

Incidentally, the rotary polygon mirror 1, the imaging lens system 52, etc. are contained in the optical box 50, and the light source 51, etc. are attached to a side wall of the optical box 50. The rotary polygon mirror 1, the imaging lens system 52, etc. are first set in the optical box 50, and thereafter a lid (not shown) is placed over an upper opening of the optical box 50.

The present invention having the features as described above exhibits the effects as described below.

It is possible to realize the hydrodynamic bearing apparatus capable of stably maintaining the excellent bearing performance throughout a long period of time while preventing deterioration of the lubricant which fills the bearing clearance. Use of such a hydrodynamic bearing apparatus in the bearing part of a rotary polygon mirror can make great contribution to attain higher performance, a longer service life, etc. of the deflection scanning apparatus.

What is claimed is:

1. A hydrodynamic bearing apparatus comprising a shaft member and a sleeve member fitted so as to be rotatable relative to each other, a lubricant filling a bearing clearance between the shaft member and the sleeve member, and a rotary member integrally coupled to the shaft member or the sleeve member, wherein the lubricant comprises a base oil comprising a mixed oil consisting of a plurality of components, and the difference between the vapor pressures of the plurality of components is not more than $5 \times 10^{-5}$ Torr in a temperature range of not less than 0° C. and not more than 60° C.

2. The hydrodynamic bearing apparatus according to claim 1, wherein at least one of the shaft member and sleeve member is provided with dynamic-pressure generating grooves.

3. The hydrodynamic bearing apparatus according to claim 1, wherein the plurality of components of the base oil are dioctyl azelate and diisooctyl adipate.

4. A hydrodynamic bearing apparatus comprising a shaft member and a sleeve member fitted so as to be rotatable relative to each other, a lubricant filling a bearing clearance between the shaft member and the sleeve member, and a rotary member integrally coupled to the shaft member or the sleeve member, wherein the lubricant comprises a base oil comprising a mixed oil consisting of a plurality of components, and the difference between the vapor pressures of the plurality of components is not more than $5 \times 10^{-4}$ Torr in a temperature range of not less than 0° C. and not more than 60° C.

5. The hydrodynamic bearing apparatus according to claim 4, wherein at least one of the shaft member and sleeve member is provided with dynamic-pressure generating grooves.

6. The hydrodynamic bearing apparatus according to claim 4, wherein the plurality of components of the base oil are trimethylol propane tripelargonate and diisooctyl adipate.

7. A hydrodynamic bearing apparatus comprising a shaft member and a sleeve member fitted so as to be rotatable relative to each other, a lubricant filling a bearing clearance between the shaft member and the sleeve member, and a rotary member integrally coupled to the shaft member or the sleeve member, wherein the lubricant comprises a base oil comprising a mixed oil consisting of trimethylol propane tripelargonate and diisooctyl adipate.

8. A hydrodynamic bearing apparatus comprising a shaft member and a sleeve member fitted so as to be rotatable relative to each other, a lubricant filling a bearing clearance between the shaft member and the sleeve member, and a rotary member integrally coupled to the shaft member or the sleeve member, wherein the lubricant comprises a base oil comprising a mixed oil consisting of dioctyl azelate and diisooctyl adipate.

9. A deflection scanning apparatus comprising the hydrodynamic bearing apparatus as set forth in any one of claims 1 to 8, a rotary polygon mirror rotationally supported by the hydrodynamic bearing apparatus, and an imaging optical system for focusing a light beam via the rotary polygon mirror on an image plane.

* * * * *

UNITED STATES PATENT AND TRADEMARK OFFICE
CERTIFICATE OF CORRECTION

PATENT NO.    : 6,375,358 B1
DATED         : April 23, 2002
INVENTOR(S)   : Ichiro Maekawa et al.

It is certified that error appears in the above-identified patent and that said Letters Patent is hereby corrected as shown below:

<u>Column 1,</u>
Line 59, "al" should read -- a --.

<u>Column 2,</u>
Line 39, "an" should read -- the --.

<u>Column 4,</u>
Line 23, "be," should read -- be --.

Signed and Sealed this

Third Day of December, 2002

JAMES E. ROGAN
*Director of the United States Patent and Trademark Office*